United States Patent
Lopez et al.

(12)

(10) Patent No.: US 6,414,760 B1
(45) Date of Patent: Jul. 2, 2002

(54) IMAGE SCANNER WITH OPTICAL WAVEGUIDE AND ENHANCED OPTICAL SAMPLING RATE

(75) Inventors: Patricia D. Lopez, Loveland, CO (US); James B. Williamson, Sunnyvale; Yucel Altunbasak, Mountain View, both of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/182,156

(22) Filed: Oct. 29, 1998

(51) Int. Cl.$^7$ .................................................. H04N 1/04
(52) U.S. Cl. ........................... 358/484; 385/25; 385/35; 385/115
(58) Field of Search ................................. 358/484, 474, 358/482, 483, 494, 496, 497, 475, 509; 385/116, 33

(56) References Cited

U.S. PATENT DOCUMENTS

| | | | |
|---|---|---|---|
| 4,760,421 A | | 7/1988 | Margolin ........................ 355/1 |
| 5,188,633 A | * | 2/1993 | Kratzer ........................ 606/12 |
| 5,418,871 A | * | 5/1995 | Revelli ......................... 385/44 |
| 5,461,491 A | | 10/1995 | Degi ........................... 358/482 |
| 5,579,054 A | | 11/1996 | Sezan et al. ................. 348/452 |
| 5,594,828 A | | 1/1997 | Nielsen et al. ............... 385/121 |
| 6,112,003 A | * | 8/2000 | Bybee .......................... 385/116 |
| 6,163,414 A | * | 12/2000 | Kikuchi ........................ 359/776 |
| 2002/0003928 A1 | * | 1/2002 | Bischel ......................... 385/39 |

OTHER PUBLICATIONS

"Restoration of a Single Superresolution Image from Several Blurred, Noisy, and Undersampled Measured Images" by Michael Elad and Arie Feuer. IEEE Transactions on Image Processing, vol.6,No.12, Dec. 1997, pp. 1646–1658.

"Modern Image Processing: Warping, Morphing, and Classical Techniques" by Christopher D. Watkins, Alberto Sadun, Stephen Marenka. Academic Press Professional. Copyright 1993.

"Tapered fiber–optic sheet formation and its image–guiding properties" by Norio Takato, Takashi Kurokawa, and Yuzo Katayama. Applied Optics/vol.20, No.8/Apr. 15, 1981. pp. 1397–1402.

"Designing a Scanner with Color Vision" by K. Douglas Gennetten and Michael J. Steinle. Hewlett–Packard Journal, Aug. 1993. pp. 52–58.

* cited by examiner

Primary Examiner—Jerome Grant, II
Assistant Examiner—Negussie Worku
(74) Attorney, Agent, or Firm—Augustus W. Winfield; Thomas M. Croft

(57) ABSTRACT

An optical waveguide and a shutter are used to guide light from multiple illuminated pixels on a document being scanned onto a single photosensor element. Various methods are disclosed for selecting one pixel at a time for projection onto a single sensor element. Multiple scans are required to capture all the image pixels. The data from multiple scans are then combined to form a single scanned image that has a higher optical sampling rate than the native optical sampling rate of the sensor array. Superresolution image analysis techniques developed for reconstruction of one image from a set of lower resolution images may be applied to provide a diffraction-limited high-resolution image. The waveguide as described also provides an ability to reduce scanning time for lower resolution images. In a first example embodiment, a rotating rod lens with a pattern of black and white areas is used to block/unblock optical waveguide array elements. In a second example embodiment, a thin mask is translated over the optical waveguide array elements. In a third example embodiment, an electronic display device such as a liquid crystal array is used to block/unblock optical waveguide array elements.

6 Claims, 6 Drawing Sheets

IMAGE SCANNER WITH OPTICAL WAVEGUIDE AND ENHANCED OPTICAL SAMPLING RATE

FIELD OF INVENTION

This invention relates generally to image scanning devices such as copiers, facsimile machines, and image scanners for computers, and more specifically to increasing the optical sampling rate through use of an optical waveguide.

BACKGROUND OF THE INVENTION

Image scanners convert a visible image on a document or photograph, or an image in a transparent medium, into an electronic form suitable for copying, storing or processing by a computer. An image scanner may be a separate device or an image scanner may be a part of a copier, part of a facsimile machine, or part of a multipurpose device. Reflective image scanners typically have a controlled source of light, and light is reflected off the surface of a document, through an optics system, and onto an array of photosensitive devices. The photosensitive devices convert received light intensity into an electronic signal. Transparency image scanners pass light through a transparent image, for example a photographic positive slide, through an optics system, and then onto an array of photosensitive devices. For convenience, in the following discussion, reference may be made to the "document" being scanned, but the invention is equally applicable to any image being scanned, whether an opaque document, a transparent film, or a scene with the imaging device focused at infinity.

Sensor arrays may be one-dimensional or two-dimensional. For convenience, in the following discussion, an optics system is used to focus a line on the document image (called a scan line) onto a one-dimensional sensor array, but the invention is equally applicable to two-dimensional sensor arrays.

A picture element (pixel) may be defined as an area on the image being scanned, or as an area on a photosensor array, or as a set of numbers in the data representing an image. For document scanners and transparent film scanners, a pixel is commonly defined as an area on the surface of the document being scanned. For example, for document and transparent film scanners, a common specification is "pixels per inch" (or mm) as measured on the surface of the document being scanned. Photosensor arrays typically have thousands of individual photosensitive elements. Each photosensitive element (or perhaps a set of photosensitive elements for color), in conjunction with the scanner optics, measures light intensity from an effective area on the document being scanned, thereby defining one pixel on the document being scanned. The optical sampling rate is the number of samples optically captured from one scan line divided by the length of the scan line. This number is often called "resolution," but a more precise definition of resolution is the ability of a scanner to resolve detail, which includes many factors including the modulation transfer function of the optics and various noise factors.

Typically, for black-and-white or grayscale, there is a one-to-one correspondence between one pixel on the document being scanned, one sensor element, and one numerical intensity measurement. Typically, for color, at least three sensor elements are required to sense all the colors for one pixel on the original image, and at least three numerical intensity values are required to represent all the colors for one pixel on the original image.

There are two types of sensor arrays commonly used for image scanners. In a first type, the length of the one-dimensional sensor array is as long as the one-dimensional scan line on the image being scanned. These sensor arrays, called Contact Imaging Sensors (CIS), have one advantage in that relatively expensive reduction optics are not required (although optical waveguides or other focusing devices may be required). However, because of their relatively large size, overall arrays typically comprise an assembly of smaller arrays. Accurately assembling multiple smaller arrays adds cost.

In the second type of commonly used sensor arrays, the length of the one-dimensional sensor array is much smaller than the length of the one-dimensional scan line on the image being scanned. These small sensor arrays require an optics system to focus a line on the document image (called a scan line) onto the sensor array. See, for example, K. Douglas Gennetten and Michael J. Steinle, "Designing a Scanner with Color Vision," Hewlett-Packard Journal, August, 1993, pp 52–58. If a lens based optics system is used, increasing resolution typically increases the cost of the lens system because reduced aberrations and other improvements in the modulation transfer function of the optics are required.

Charge coupled devices (CCD's) are frequently used for the second type of sensor arrays. Typically, CCD arrays comprise a single integrated circuit so that the expense of assembling multiple arrays is avoided. Increasing the optical sampling rate requires more pixels per scan line, and therefore, requires more CCD elements per scan line. Increasing the number of CCD elements typically results in more overall circuit area and longer arrays, and therefore higher cost. One approach to reducing the area and length of the overall arrays is to reduce the size of individual photosensitive elements. In general, regardless of the size of an individual photosensitive element, each photosensitive element receives, through an optics assembly, the light from a fixed pixel area on the image being scanned. That is, the total light received by a photosensitive element is determined by the size of the pixel on the image being scanned and ideally is independent of the size of the photosensitive element. Therefore, instead of sensitivity considerations, the minimum size of a photosensitive element is typically determined by integration circuit fabrication technology or the optics system (for example, fundamental diffraction limits). Typical CCD arrays for color scanners have active areas that are already close to a minimum practical size. Therefore, for linear arrays, increasing the optical sampling rate forces the overall length of the arrays to increase. For example, a typical CCD element for line image scanners is about 7 $\mu$m by 7 $\mu$m. A document with a width of 8.5 inches (216 mm) and an optical sampling rate of 1200 pixels per inch (47 pixels per mm) requires 10,200 photosensors per row. If each element is 7 $\mu$m wide, the length of each linear array must be at least 71 mm long just for the sensor elements. In a typical array layout, additional length is needed for other electronics. For commonly used five inch (127 mm) diameter silicon wafers, the result may be that only one sensor assembly can be fabricated on each silicon wafer. This greatly increases the expense of sensor arrays. Alternatively, as for CIS modules, multiple sensor array segments may be assembled to provide an overall larger sensor, with the additional cost of assembling multiple segments.

There is a need for high scanning optical sampling rate without requiring a corresponding increase in the expense of the sensor array and without requiring expensive lens based optics.

SUMMARY OF THE INVENTION

A scanner in accordance with various example embodiments of the invention multiplexes light from multiple pixels on the document being scanned onto each sensor element. Instead of a one-to-one or many-to-one relationship between sensor elements and one pixel on the document, there is a many-to-one relationship between pixels on the document and one sensor element. In the various example embodiments, an optical waveguide is used to guide light from multiple pixels on the document being scanned onto a single photosensor element. Each sensor element measures the light from multiple pixels on the document, one at a time. That is, the optical waveguide has a higher optical sampling rate than the sensor array. Various methods are disclosed for selecting one original image pixel at a time for projection onto a single sensor element. If, for example, four image pixels are guided onto a single sensor element, then four separate scans are required to capture all the image pixels. Data from the four scans are then combined to form the overall data for a single scanned image. The resulting image has four times more true non-interpolated pixel data relative to the data that would be normally specified by the optical sampling rate of the sensor array. The method can be generalized so that N pixels on the image being scanned are guided onto M sensor elements. Superresolution image analysis techniques developed for reconstruction of one image from a set of lower resolution images may be applied to provide a diffraction-limited high-resolution image. The waveguide as described also provides an ability to reduce scanning time for lower resolution images.

In a first example embodiment, a rotating rod lens with a pattern of black and white areas is used to block/unblock optical waveguide array elements. In a second example embodiment, a thin mask is moved over the optical waveguide array elements. In a third example embodiment, a display array technology having electronically controllable transparent and opaque areas, for example a liquid crystal array, is used to block/unblock optical waveguide array elements.

DETAILED DESCRIPTION OF THE PREFERRED EMBODIMENT OF THE INVENTION

Figure 1:
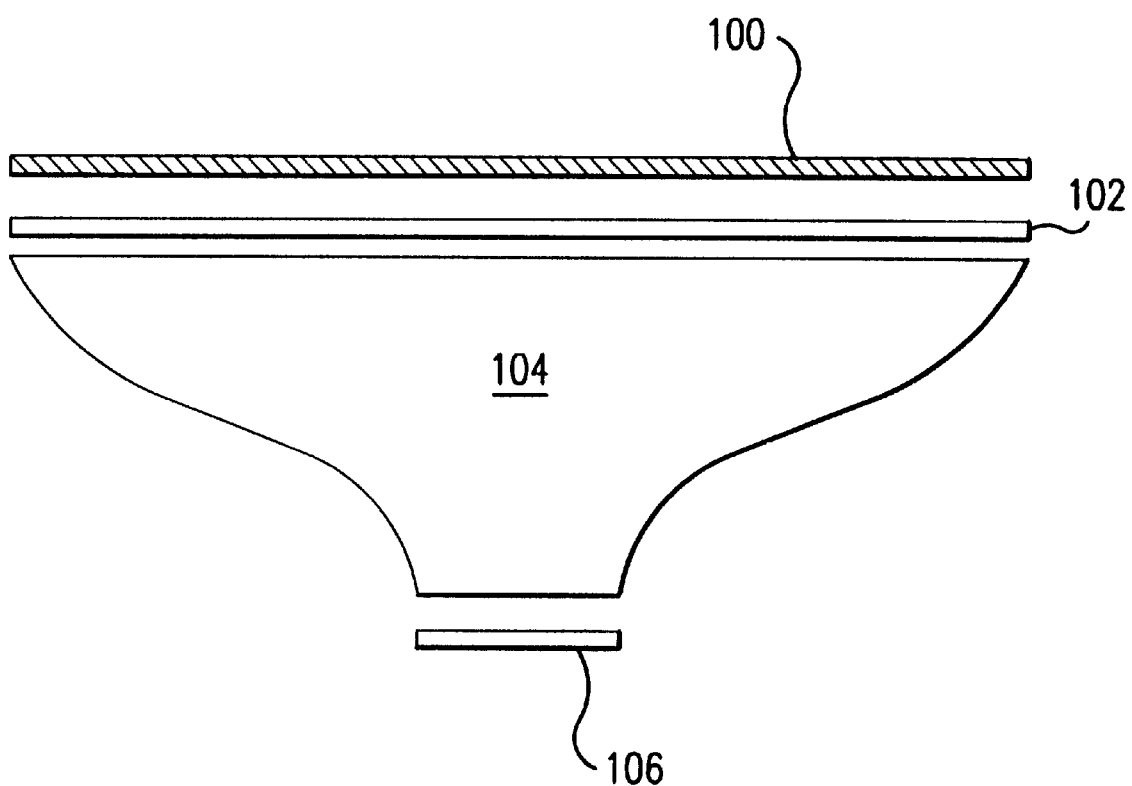
FIG. 1 is a front cross-section view of a scanner including a waveguide, a sensor array, and a shutter in accordance with the invention.

FIG. 1 illustrates a scanner including an optical waveguide in accordance with the invention. A transparent platen 100 supports a document to be scanned. A shutter 102 blocks or transmits light into individual optical paths within a waveguide 104. The shutter 102 will be discussed in more detail below. The optical waveguide 104 guides light from the document being scanned onto a photosensor array 106. For an example of a method of fabrication of suitable optical waveguides, see Norio Takato et al., "Tapered fiber-optic sheet formation and its image-guiding properties," *Applied Optics,* Vol. 20, No.8, pp 1397–1402 (1981). In FIG. 1, the sensor array is illustrated as having a length that is less than the width of the platen 100. The invention is equally applicable to CIS arrays, but is particularly advantageous when used with smaller low-cost sensor arrays. In FIG. 1, the shutter is illustrated as being positioned between the document being scanned and the optical waveguide. Alternatively, the shutter could be positioned between the waveguide 104 and the sensor array 106. However, assuming that the sensor array 106 is relatively small, for fabrication and alignment reasons it may be easier to implement a relatively large shutter between the document and the waveguide as illustrated in FIG. 1.

Figure 2A:
FIG. 2A is a top view of a first example embodiment of the waveguide of FIG. 1.
Figure 2B:
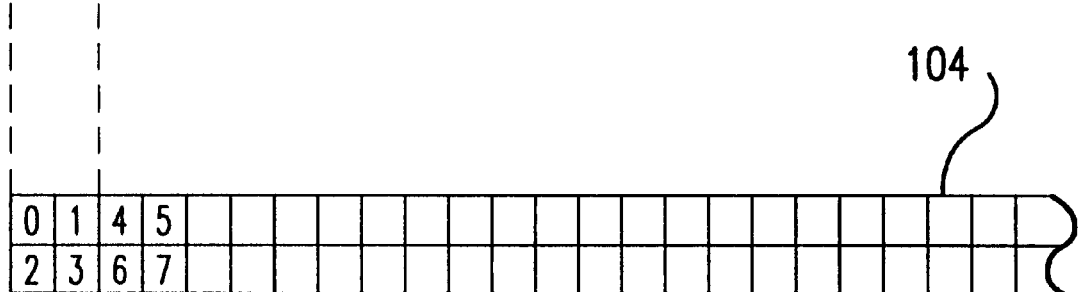
FIG. 2B is a top view of a second example embodiment of the waveguide of FIG. 1.
Figure 2C:
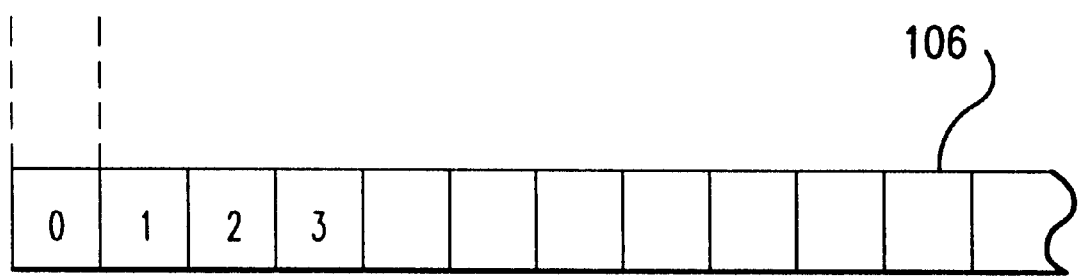
FIG. 2C is a top view of the sensor array of FIG. 1.

FIG. 2A illustrates one example embodiment of an optical waveguide in which two optical paths through the waveguide are directed onto one sensor element of the sensor array (FIG. 2C). Optical path N for the waveguide of FIG. 2A is directed onto sensor element N MOD 2 in the sensor array of FIG. 2C. FIG. 2B illustrates a second example embodiment of a waveguide in which four optical paths through the waveguide are directed onto one sensor element of the sensor array (FIG. 2C). Path N for the waveguide of FIG. 2B is directed onto sensor element N MOD 4 for the sensor array of FIG. 2C. For the highest optical sampling rate, for any one sensor element, if the shutter is positioned between the document being scanned and the waveguide, then at most one of the optical paths through the waveguide directed onto the sensor element receives light reflected from the document. For the highest optical sampling rate, the shutter 102 ensures that each sensor element receives light from at most one of the optical paths in the waveguide that are directed onto the sensor element. As will be discussed in more detail later, lower sampling rates and higher scanning speed may be obtained by directing the light so that one sensor element receives light from more than one of the optical paths in the waveguide that are directed onto the sensor element.

Figure 3:
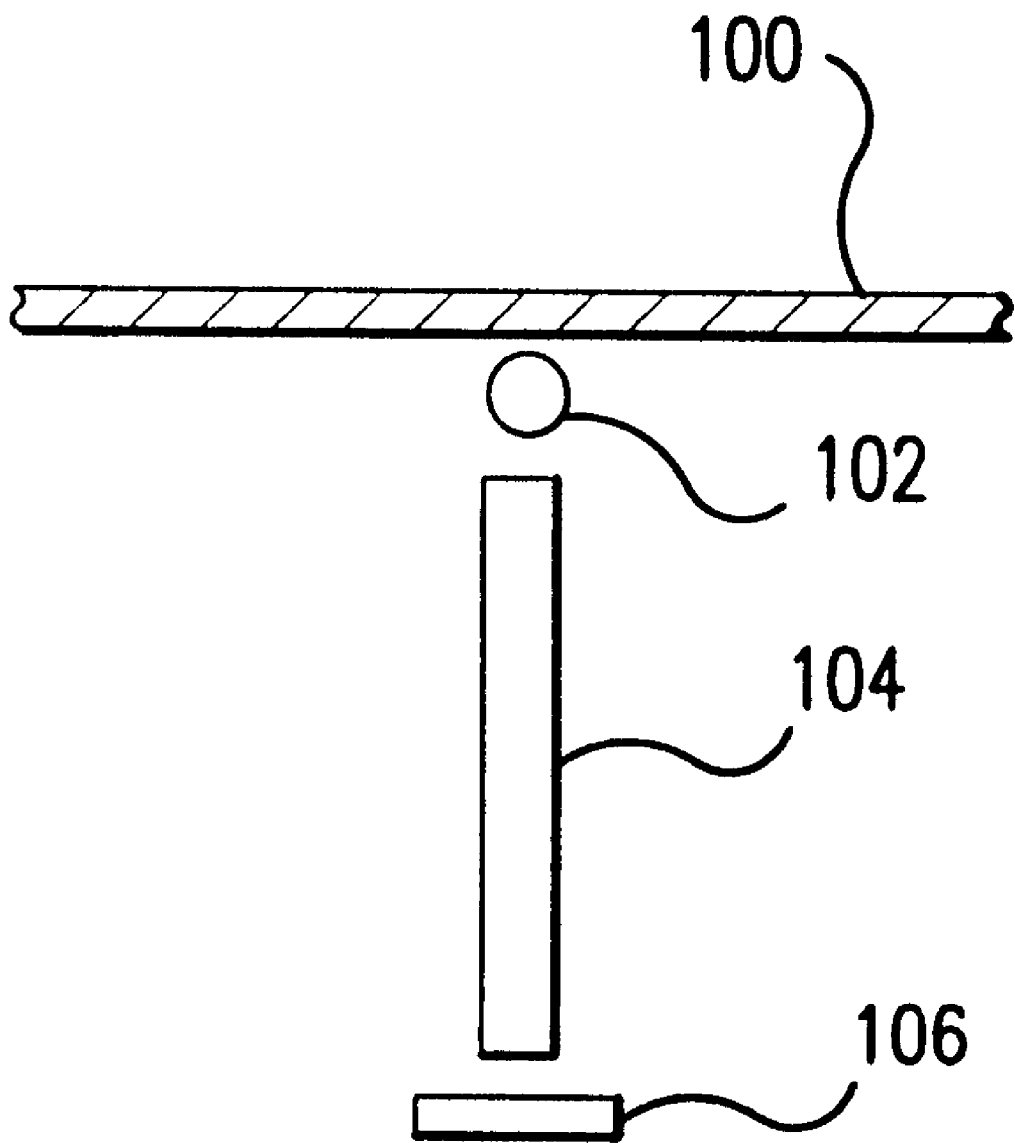
FIG. 3 is a side view of the scanner of FIG. 1, illustrating a rod lens as one example implementation of the shutter of FIG. 1.

In FIG. 3, an example embodiment of the shutter 102 is a cylindrical rod lens with an appropriate pattern of transparent and opaque areas. A rod lens permits cycling through the various optical paths in the optical waveguide by simply rotating the lens. The lens is rotated around a central axis along the length of the rod by any conventional rotation device, such as a motor (not illustrated).

Figure 4A:
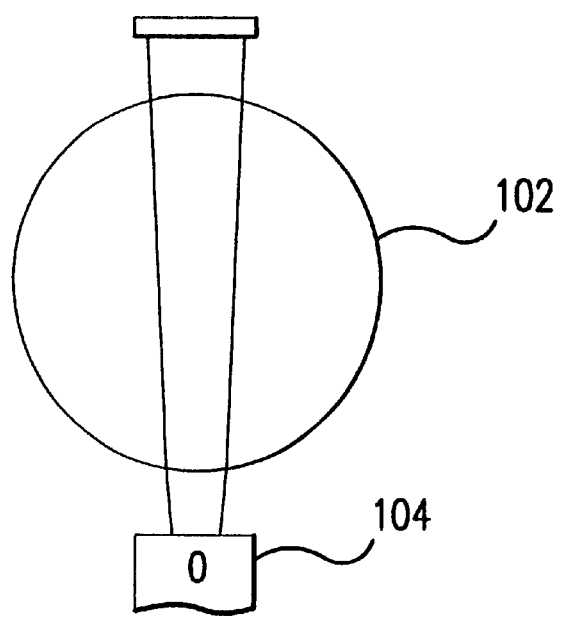
FIG. 4A is an expanded side view of the scanner illustrating an end view of a rod lens and a single row waveguide (as in FIG. 2A).
Figure 4B:
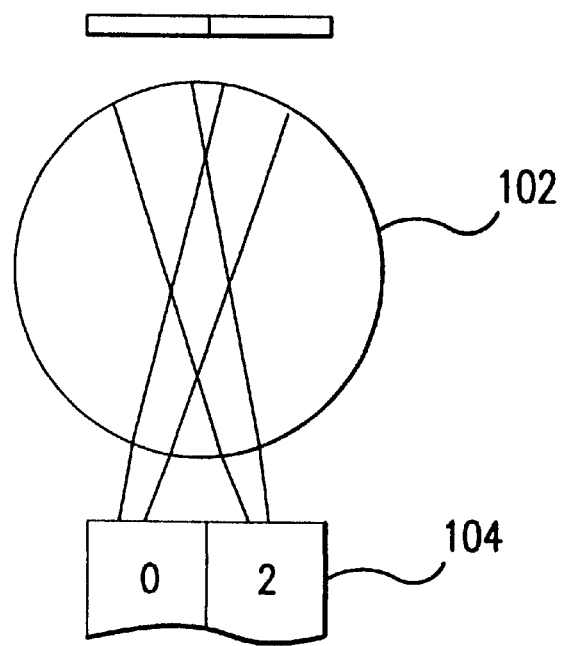
FIG. 4B is an expanded side view of the scanner illustrating an end view of a rod lens and a double row waveguide (as in FIG. 2B).

FIG. 4A illustrates a rod lens and a single row waveguide as illustrated in FIG. 2A. FIG. 4B illustrates a rod lens and a double row waveguide as illustrated in FIG. 2B.

Figure 5:
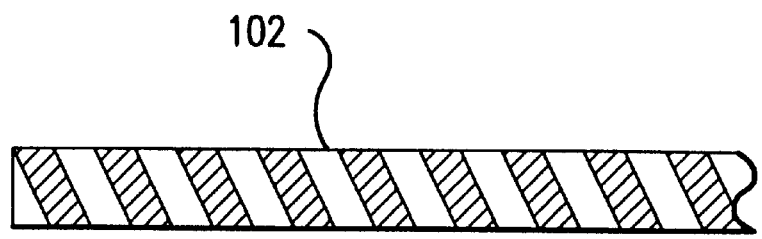
FIG. 5 is a front view of the rod lens of FIG. 3 patterned with an example pattern suitable for the waveguide of FIG. 2A.

FIG. 5 illustrates a rod lens patterned with a "barber pole" spiral stripe that is opaque. Consider the rod lens of FIG. 5 positioned above a single row waveguide, as in FIGS. 2A and 4A. As the lens is rotated about an axis along its length, the opaque spiral stripe alternately covers optical paths of the waveguide. For example, the opaque spiral stripe may cover path 1 in FIG. 2A and then path 0 in FIG. 2A and repeating as long as the lens is rotating. If the paths are square or rectangular as illustrated in FIG. 2A, then coverage is not exact. For example, there may never be a point where path 1 is completely covered and path 0 is completely exposed, but the shuttering effect is sufficient for purposes of the present application. Alternatively, the entrance to the light paths in the waveguide may be made parallelogram shaped with sides that align with the angle of the opaque stripe on the rod lens.

Figure 6:
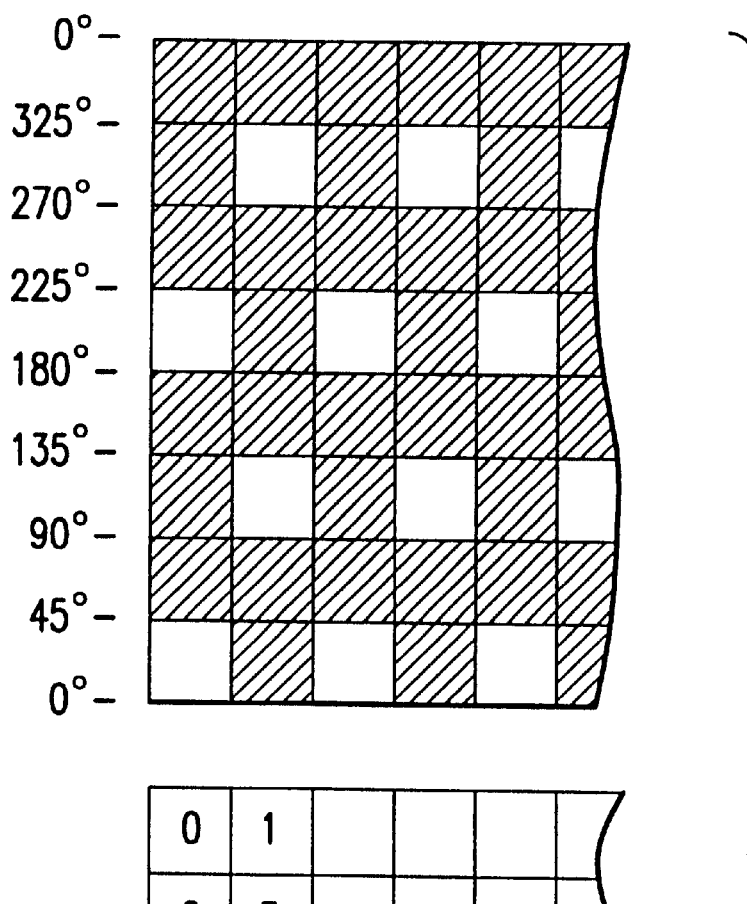
FIG. 6 is a plan view of a pattern suitable for applying to the rod lens of FIG. 3 and suitable for the waveguide of FIG. 2B.
Figure 7A:
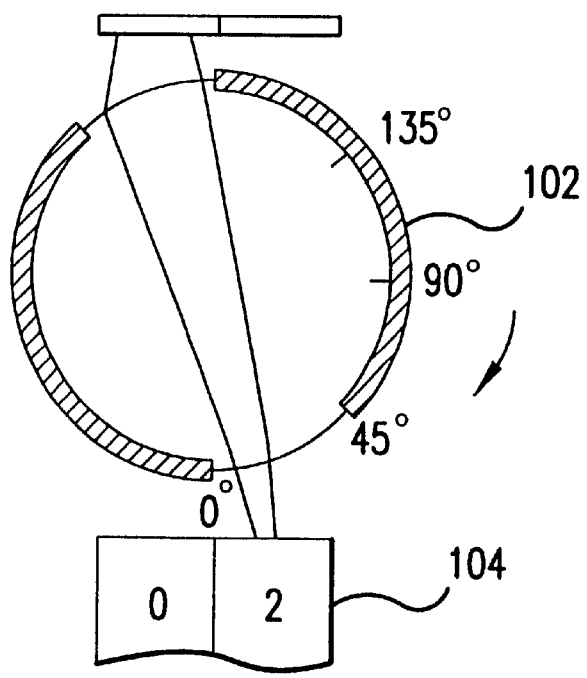
FIG. 7A is a side view of the scanner illustrating an end view of a rod lens with the pattern of FIG. 6 in a first rotational position.

FIG. 6 illustrates part of an alternative example pattern applied to the surface of a rod lens, and is an example of a pattern suitable for use with a dual row waveguide as illustrated in FIGS. 2B and 4B. The pattern illustrated is wrapped around the circumference of the rod lens. In the following discussion, only four of the photosensor elements will be discussed but the rod lens pattern repeats for each set of four waveguide paths along the length of the waveguide. If the rod lens is rotated so that the line indicated by "0" in FIG. 6 is aligned with the boundary between paths 0 and 2 in FIG. 2B, then only path 2 receives light from the document being scanned. This is illustrated in FIG. 7A. If the rod is then rotated 45° so that the line indicated by "45°" in FIG. 5 is aligned with the boundary between paths 0 and 2 in FIG. 2B, then only path 0 receives light. Similarly, if the rod lens is rotated an additional 45°, only element 3 receives light and if the rod is rotated an additional 45° then only element 1 receives light. The pattern repeats for each subsequent 180° of rotation.

Figure 7B:
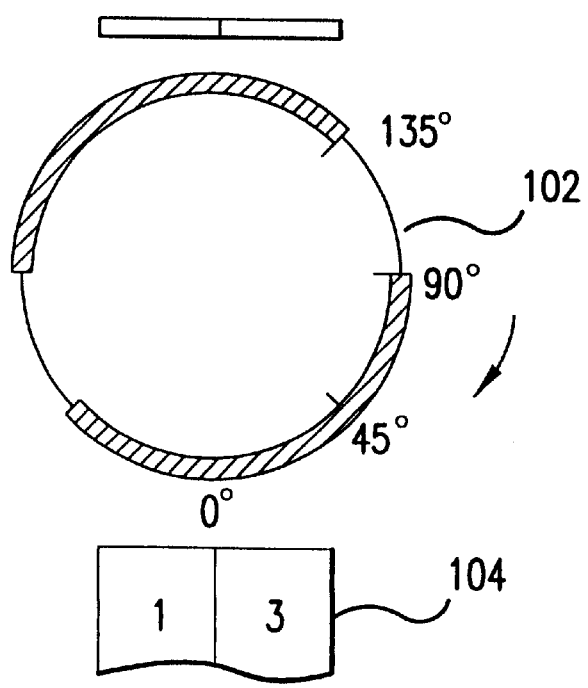
FIG. 7B is a cross section side view of the scanner illustrating a cross section end view of a rod lens with the pattern of FIG. 6 in the first rotational position.

FIG. 7A is a cross-section end view of a rod lens with the pattern of FIG. 6, along with paths 0 and 2 of the waveguide 104, with the rod lens at 0° so that only element 2 receives light. If the rod lens rotates 45° in the direction illustrated by the arrow in FIG. 7A then path 0 will receive light. FIG. 7B is a cross-section end view of rod lens as in FIG. 7A but illustrating paths 1 and 3 of the waveguide 104. As illustrated in FIG. 7B, if the rod lens rotates 90° in the direction illustrated by the arrow then path 3 will receive light.

As one example alternative, shutter 102 may be implemented by a display technology, for example liquid crystal display (LCD), having transparent regions and opaque regions that may be used to electronically shutter the waveguide. Alternatively, a flat plate with transparent and opaque areas may be translated back and forth to selectively gate light into the waveguide. In particular, the pattern illustrated in FIG. 6 may be implemented as a flat plate with openings or transparent sections and the plate may be translated in one dimension to act as a shutter. The flat plate may be actuated by any conventional mechanism for one dimensional translation, including for example, piezoelectric actuators, voice coils, and linear stepper motors, or by conventional transformation from a rotary actuator (no translation mechanism is illustrated).

Signals from sensor elements are converted into numerical data using analog-to-digital converters. Since each sensor element senses light from one pixel at a time, data from multiple intermediate scanned images must be reassembled into data for a complete scanned image. For example, for a single row waveguide as in FIG. 2A, the data from two intermediate scans may be simply interleaved on a row by row basis to provide a complete scanned image. That is, for each row, the data corresponding to waveguide path 1 (from one scan) may be inserted between the data corresponding to waveguide paths 0 and 2 (from a separate scan), and so forth. Similarly, for a dual-row waveguide as in FIG. 2B, data from four intermediate scans may be interleaved two rows at a time into one complete scanned image.

Often, the desired single image may have a sample rate that is less than the highest possible optical sampling rate. For example, scanners often perform a low-sampling-rate preview scan to enable color adjustment and to enable selection of an area to be scanned. In addition, high resolution color images require a lot of memory, and image analysis may require a substantial amount of time. Accordingly, an operator may choose a lower sampling rate to reduce memory and/or processing time. Finally, in some scanning configurations, scanning time may be reduced if sample rate is reduced. Scanning time is often limited by an exposure time per pixel required to obtain a particular signal-to-noise ratio. For example, see U.S. Pat. No. 5,461,491 (Degi), in which charges for adjacent CCD elements are combined to enable a faster, but lower sampling rate scan. The waveguide of the present invention enables a different approach. With the waveguide of the present invention, for some lower sampling rates, a single sensor element may receive the light from more than one optical path through the waveguide, thereby reducing the required exposure time, and thereby reducing the scan time. For example, consider again a waveguide as in FIG. 2B. Assume that the highest optical sampling rate is 1,200 pixels per inch. That is, if each sensor element receives light from exactly one of the optical paths in the waveguide that are directed onto the sensor element, then the optical sampling rate is 1,200 pixels per inch. However, if the shutter exposes all optical paths so that four optical paths in the waveguide are directed onto the sensor element, then the sensor element receives four times as much light, and the exposure time may be reduced by three-fourths. The resulting image sampling rate is reduced by two (to 600 pixels per inch) but scanning is four times as fast (assuming that exposure time is the limiter of scanning time).

As discussed above, if the highest optical sampling rate is desired, pixel data may be simply interleaved. However, scanner operators often request some non-integral fraction of the highest optical sampling rate. For example, an image may need to be scaled to fit within a frame in a document with a sampling rate that is determined by the resolution of a printer. As a result, the desired sampling rate may be any arbitrary number. Typically, samples for a single scan line are read by the scanner at the highest optical sampling rate, intermediate interpolated samples are computed, and the desired sampling rate is obtained by resampling the interpolated samples. For example, a scanner may have a 1,200 pixel per inch optical sampling rate, and may interpolate to 4,800 pixels per inch, and then sample the 4,800 pixels per inch to provide an image having 938 pixels per inch (where 938 is just an arbitrary example). For scanners having a moving linear sensor array, interpolation and resampling may provide an arbitrary resolution along the scanline, and resolution in the direction of scanning may be controlled by the translation speed of the sensor array. However, for a multi-row waveguide, as in FIG. 2B, the spacing for pairs of adjacent rows is fixed by the waveguide. Therefore, for a multi-row waveguide, a better image may be obtained if two dimensional information is used. That is, a two dimensional image having M×N pixels per inch may be resampled to provide a image having K×L pixels per inch. The process of transforming a digital image from one set of pixel coordinates to another set of pixel coordinates is called geometric image resampling. One method for computing geometric image resampling is bilinear interpolation using the intensities of the four closest neighboring sensor values. See, for example, Christopher D. Watkins, et al., *Modern Image Processing: Warping, Morphing, and Classical Techniques*, (Cambridge, Mass., Academic Press, 1993), pp. 99–102.

A still better image may be obtained if image processing is used to remove various aberrations in the optical system, such as spherical aberration, coma, astigmatism, field curvature, chromatic aberration, motion blur, and stray reflections (ghosting). One method for compensation of aberration involves linear system theory and the impulse response of the system. In optical systems, the impulse response, or the image of a bright point object against a dark background, is called the point-spread function. The two-dimensional Fourier transform of the spatial domain point-spread function is called the optical transfer function. The frequency domain optical transfer function includes magnitude and phase. A two dimensional, magnitude only, vertical slice through the optical transfer function is called the modulation transfer function. If an image is blurred by an optical system, some blurring can be removed in the frequency domain by dividing the transform of the blurred image by the optical transfer function for the same imperfect optics. Convolution in the spatial domain is equivalent to multiplication in the frequency domain. Accordingly, as an alternative, some blurring may be removed in the spatial domain by convolution with an appropriate two-dimensional kernel derived from the point-spread function.

Image analysis for the highest possible (diffraction-limited) resolution may be combined with image analysis for optimal two dimensional sub-sampling. In particular, analysis that has been developed for combining several images (with some offset) into one high-resolution image is applicable to a system in accordance with the present invention. That is, a waveguide that guides an M×N matrix of pixels onto one sensor element may be viewed as producing M×N offset images that may be combined into one image. For an example of the approach, see Michael Elad and Arie Feuer, "Restoration of a Single Superresolution Image from Several Blurred, Noisy, and Undersample Measured Images," *IEEE Transactions on Image Processing*, vol. 6, no.12, pp 1646–1658, December, 1997.

Given a set of N images, $Y_k$, a new image, X, may be derived having either a higher or lower resolution, from the following matrix operations:

$$Y_k = D_k H_k F_k X + V_K$$

k=1, . . . N.

$Y_k$ is one of the original set of N scanned images.

X is the new single image derived from the set of N scanned images.

$F_k$ is a translation operation between the image X and an interpolated version of image $Y_k$.

$H_k$ is a blur matrix, representing the scanners point-spread-function.

$D_k$ is a decimation matrix, which presents the sample rate of image X relative to the sample rate of image $Y_k$.

$V_k$ is a matrix representing additive measurement noise.

If the waveguide is stationary relative to the document during each scan (for example, for 2×2, if four scans are performed with no motion), then $F_k$ is simply the offset of the waveguide light paths. If the waveguide is moving during the scan, additional motion information may be needed for $F_k$. For a scanner in accordance with the present invention, $H_k$, $D_k$, and $V_k$ are the same for every k so they can be replaced by H, D, and V respectively. V may be estimated as Gaussian random vectors with zero mean. Given $F_k$, H, D and V, computation of image X is a classic inverse problem. An iterative solution is efficient. Using a Steepest Descent algorithm, the following iterative equation may be used.

$$\underline{X}_{j+1} = \underline{X}_j + \mu[\underline{P} - R\underline{X}_j]$$

where $\underline{X}_0$, the initialization vector can be any vector, and where $\mu > 0$ is small.

Substituting $F_k$, H, D and V, the iterative equation becomes:

$$\underline{X}_{j+1} = \underline{X}_j + \mu \sum_{k=1}^{N} F_k^T H^T D^T [\underline{Y}_k - DHF_k \underline{X}_j]$$

The term $DHF_k X_j$ means that $X_j$ is to be displaced by [dx(k),dy(k)]K (K is the resolution ration required by the scanner operator), blurred, and decimated. The resulting image is simply subtracted from the image $Y_k$.

In tests using actual images, with $\mu$=3.5/N, suitable results have been obtained after ten iterations. The above approach, combining compensation for blurring effects with two-dimensional interpolation and resampling, is superior to simple interleaving of images, or bilinear interpolation.

Optical waveguides may be inexpensive relative to the cost of lens systems and photosensor arrays. Providing high optical sampling rate in a waveguide as discussed above, which in turn enables an reduction in optical sampling rate of the relatively expensive photosensor array, reduces overall scanner cost. At the highest optical sampling rate, there may be a tradeoff of scanning speed resulting from multiple exposure times per row. However, scanning speed for lower sampling rates may be faster than a scanner without comparable waveguides, because of reduced exposure times.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. An image scanner comprising:
   an array of photosensor elements;
   an optical waveguide suitable for guiding light from pixels on an original image onto the photosensor elements; and
   a rotatable cylindrical rod lens, wherein for each photosensor element, the lens passes light from at most one pixel on the original image and blocks light from all other pixels.

2. The image scanner of claim 1, the lens having some areas that are transparent and other areas that are opaque.

3. A method of scanning an image, the method comprising the following steps:
   guiding, by an optical waveguide and a rotatable cylindrical rod lens having some areas that are transparent and other areas that are opaque, light from a first pixel on the image onto a photosensor element;

determining a first numerical value corresponding to the intensity of light received from the first pixel;

guiding, by the optical waveguide and the lens, without relative movement between the optical waveguide and the image, light from a second pixel on the image onto the photosensor element;

determining a second numerical value corresponding to the intensity of light received from the second pixel; and placing the first and second numerical values into an array of numerical values representing the image.

4. The method of claim 3 wherein the light from the first pixel and the light from the second pixel are simultaneously guided onto the photosensor element.

5. The method of claim 3, further comprising:

modifying the first and second numerical values, further comprising the following step:

compensating for blurring.

6. The method of claim 3, further comprising:

modifying the first and second numerical values, further comprising the following step:

resampling to provide a resolution that is different than a resolution determined by a distance between the first and second pixels.

* * * * *